Feb. 28, 1933. A. N. COOPER 1,899,854
TWO-PEDAL COASTER
Filed Aug. 27, 1931 2 Sheets-Sheet 2
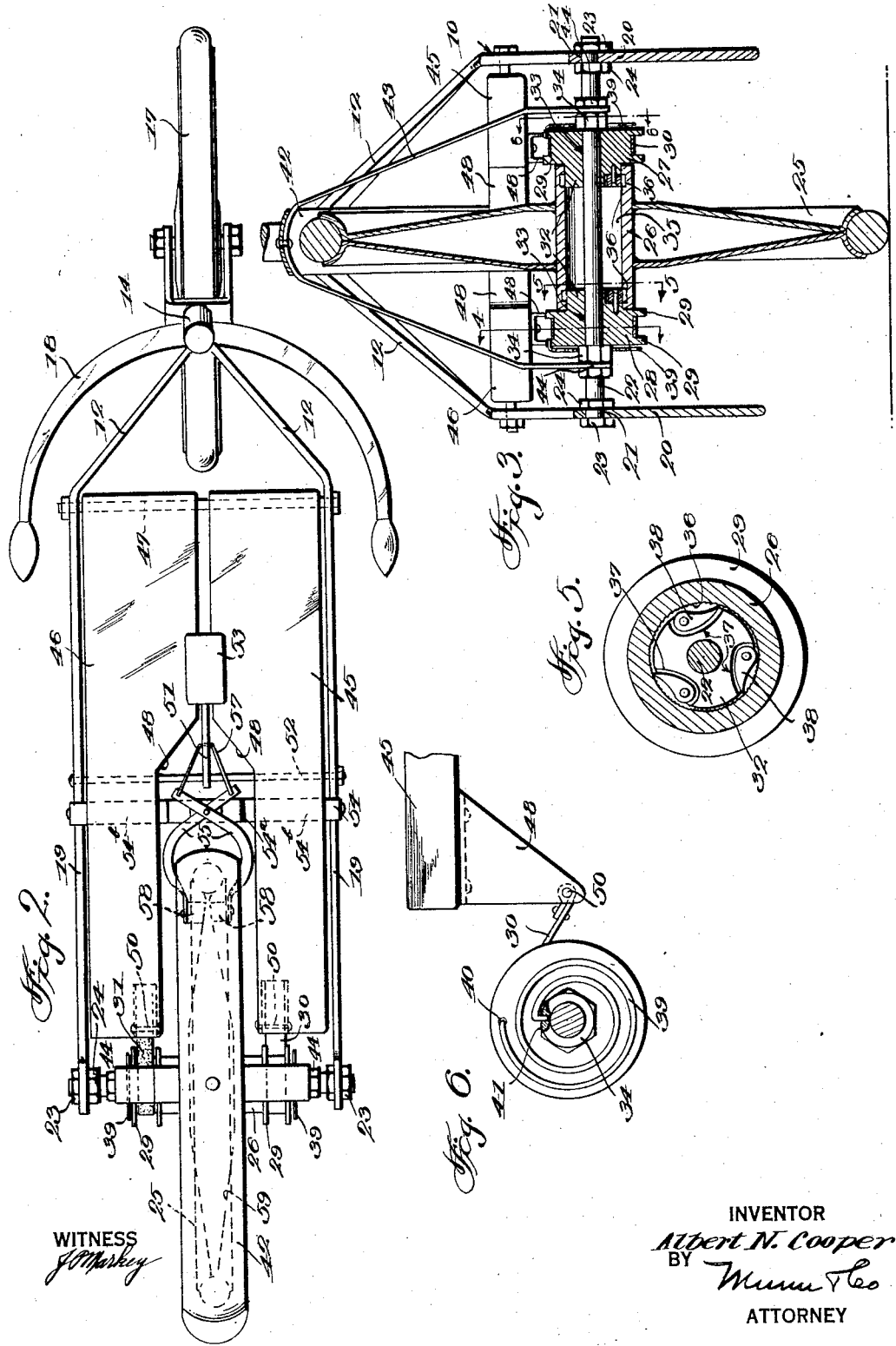

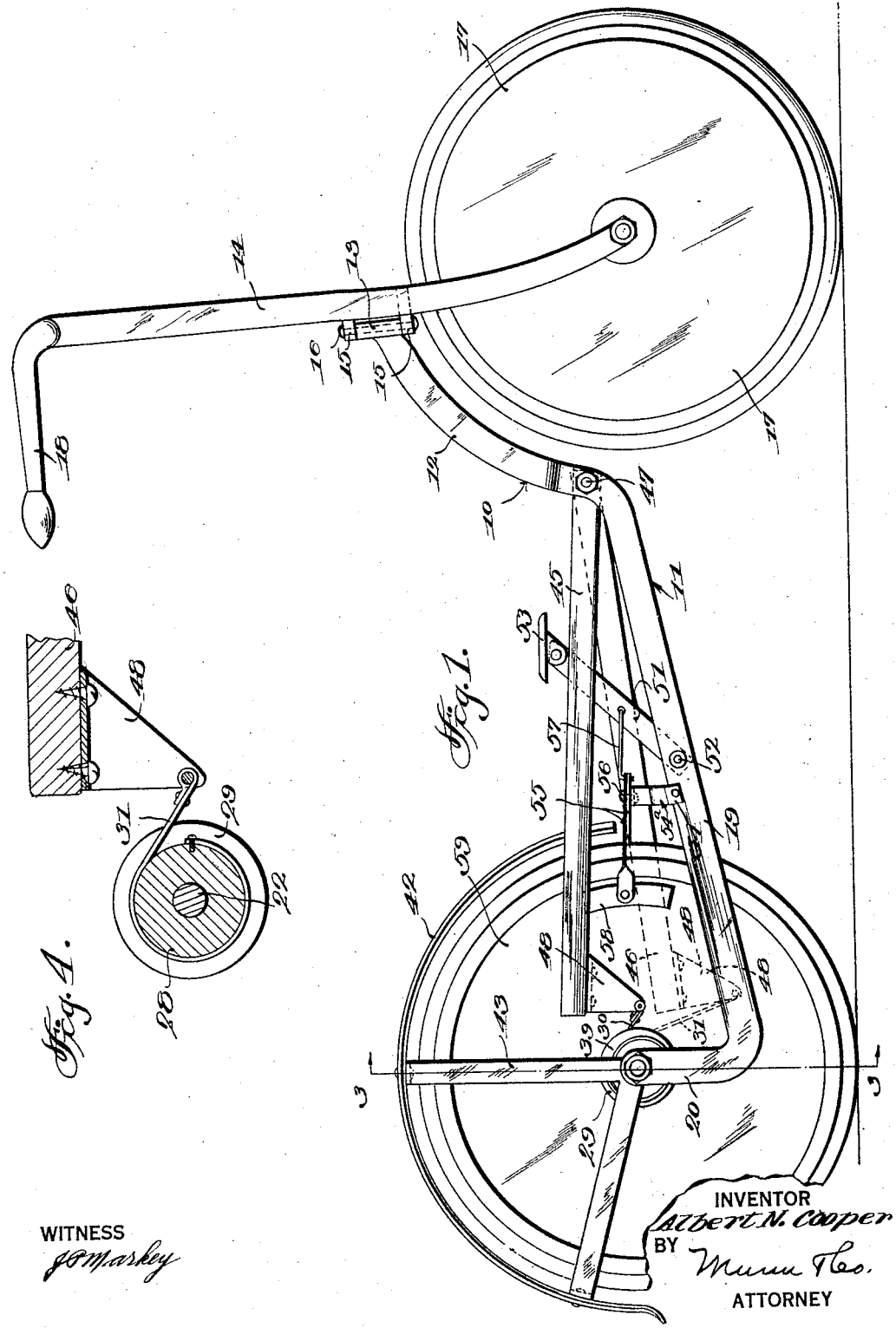

Patented Feb. 28, 1933

1,899,854

UNITED STATES PATENT OFFICE

ALBERT N. COOPER, OF SANTA ANA, CALIFORNIA, ASSIGNOR TO JESSE A. MACKEY, OF PLACENTIA, CALIFORNIA

TWO-PEDAL COASTER

Application filed August 27, 1931. Serial No. 559,791.

My invention relates to a two pedal coaster, and it consists in the constructions, arrangements and combinations herein described and claimed.

It is an object of the invention to provide a two pedal coaster of novel construction in which the pedal members function to support the operator, as well as establishing means for rotating the drive wheel of the coaster.

It is a still further object of the invention to provide a new and novel drive means of such construction as to be readily incorporated within the hub member of the drive wheel, yet employing separate driving connections with the treadle members.

A still further object of the invention is to provide a novel pedal-operated brake means for controlling the speed of the coaster, the braking action being evenly distributed upon opposite sides of the drive wheel, and thereby avoiding unbalance of the coaster during a braking operation.

Additional objects, advantages and features of invention will be apparent from the following description and accompanying drawings, wherein:

Figure 1 is a side elevation of a coaster constructed in accordance with my invention;

Fig. 2 is a top plan view thereof;

Fig. 3 is a vertical cross section on the line 3—3 of Fig. 1;

Fig. 4 is a cross section on the line 4—4 of Fig. 3, illustrating the drive connection between one of the pedal members and the drive wheel hub;

Fig. 5 is a cross section on the line 5—5 of Fig. 3; and

Fig. 6 is a cross section on the line 6—6 of Fig. 3.

In carrying out my invention I provide a frame 10 having a dropped medial portion 11, as clearly shown in Fig. 1. The frame 10, in the present instance, is formed from a single strap of heavy gauge metal, bent substantially into U-shaped formation, as viewed in top plan (see Fig. 2), the portions 12 defining the bight portion thereof, being bent inwardly at an angle to one another, to define a bearing 13. The bearing 13 is positioned in the longitudinal center of the frame, and upon this bearing I pivotally mount the fork 14, by means of the ears 15 and pintle 16.

The fork 14 revolubly mounts the front wheel 17, and a handle bar 18 formed integrally with the fork 14 or otherwise, permits steering of the wheel 17, as will be readily understood.

The portions 12 of the frame have an arcuate shape conforming to the periphery of the wheel 17, but are spaced a suitable distance therefrom permitting ready turning movements of the wheel 17 for steerage of the coaster.

The side members 19 of the dropped portion 11 of the frame are inclined downwardly toward the rear and terminate in vertically disposed arms 20. The arms 20 are apertured, as at 21, to receive an axle 22, which is maintained against rotation by nuts 23—24 and bind upon opposite sides of respective arms 20.

A drive wheel 25 is revolubly supported upon the axle 22. The wheel 25 includes a hub 26, in respective ends of which there are loosely and oscillatably mounted pulleys 27—28. As clearly shown in Fig. 3, each pulley 27—28 includes a pair of annular spaced flanges 29 and between respective pairs of flanges, I secure flexible strap members 30—31, the purpose of which will be explained more fully hereinafter.

Each pulley 27—28 has a trunnion 32 journalled in respective ends of the hub 26, and each pulley has an axial bore 33 receiving the axle 22 therethrough. In order to secure the pulleys 27—28 in proper relation to the hub of the wheel 25, the shaft 22 is preferably provided with screw threads immediately outward of that portion of the shaft occupied by respective pulleys 27—28, for reception of nuts 34.

From the foregoing, it will be seen that the wheel 25 is revolubly journalled upon the trunnions 32. In adjusting the pulleys 27—28 within the hub 26, care should be taken to see that the nuts 34 do not bind the pulleys against the hub, since the wheel 25 should be freely revoluble upon the trunnions.

Adjacent each end of the hub 26, and upon the interior of the bore 35 thereof I provide an annular series of ratchet teeth 36. These teeth it will be noted are slightly countersunk and thus do not interrupt the true cylindrical surface of the bore of the hub.

The trunnions 32 are provided adjacent their ends with a plurality of recesses 37, and in each recess there is pivotally mounted a pawl 38. With the pulleys assembled within the hub 26, the pawls 38 occupy a position so as to be swung into engagement with the ratchet teeth 36. This action will be more fully dealt with in the description of the operation of the coaster.

In order to maintain the pulleys 27—28 in a normal position a heavy helical spring 39 is provided, one end thereof being anchored in the outer flange 29, as at 40, (see Fig. 6) while the other end of the spring may be anchored to the nut 34, as indicated at 41.

A mud guard 42 is supported by a suitable frame 43, as at 44, this guard protecting the operator against splashings of water or mud, as readily understood.

A pair of treadle members 45—46 is provided, rockably mounted at their forward ends upon a rod 47. The treadles 45—46 extend rearwardly within the frame 10, and as seen in Fig. 2, the inner longitudinal edges are cut away, as at 48, to accommodate the rear wheel 25 and associated mud guard 42. The rear extremities of the treadles 45—46 stop short of the hub 26 and upon their under sides there is secured a downwardly extending lug 48. Each lug includes a pintle 50, to which the free end of each respective strap 30—31 is secured.

The straps 30—31 may be wound several times around their respective drums, or a single turn therearound, as shown in Fig. 4, will be sufficient and in any event the straps 30, 31 extend from the upper portion of the drums downwardly toward the lugs 48. Thus a downward pressure of the treadles 45—46 will readily oscillate the pulleys 27—28.

The wheels 17 and 25 are shown as of the disk type and may include rubber tires or otherwise, as desired.

Attention is now invited to Figs. 1 and 2 of the drawings, for an understanding of my brake construction, which I have generally indicated at 51. A cross rod 52 is secured intermediate the length of the side members 19 and upon this rod there is rockably mounted a foot pedal 53. Since the treadle members 45—46 are in spaced relation to one another, the foot pedal 53 may move backwardly and forwardly in the space provided therebetween. Immediately to the rear of the rod 52, a flat bar 54 is secured, extending across the space defined by the side bars 19. The bar 54 is bent intermediate its length to provide an upstanding bearing 54ª, which as clearly shown in Fig. 2 is disposed between the cut away portions 48 of the treadles 45—46. Thus the treadles may move upwardly upon respective sides of the bearings 54ª and the horizontal portions 54ᵇ serve as stop members and limit the downward movements of the treadles.

The bearing 54ª is centrally apertured for support of brake levers 55. The levers 55 are crossed, as clearly shown in Fig. 2 and pivoted upon a common pivot 56. The levers project beyond the pivot 56 and are suitably apertured for connection of a cable 57, which is made fast to the foot levers 51. The arms 55 are curved slightly outward and thence inwardly so as to embrace the rim of the wheel, and terminate in brake shoes 58. The shoes 58 are adapted to frictionally contact the disks 59 of the wheel 25 when the pedal 53 is depressed. It will be noted that by this construction an even braking action upon the wheel 25 will obtain, and thus avoid liability of throwing the operator off balance.

The operation will be readily understood from the following description:

The operator will grasp the handle bar 18, and usually will propel the coaster by pushing the same for a short distance and then jump upon the treadles 45—46, one foot being positioned upon each of the treadles. The weight of the operator is then alternately shifted from one treadle to the other, producing an up and down motion thereto.

We will assume that the treadle 45 is in the position shown in Fig. 1 and the treadle 46 is in the down position, by reason of the weight imposed thereon. The operator then exerts a downward pressure upon the treadle 45 by shifting his weight thereto, causing the rear end thereof to swing downwardly drawing downwardly upon the strap 30. When the strap 30 is thus drawn, it will be seen that the pulley 27 will be rotated in a forwardly direction, and inasmuch as the pawls 38 will be thrown outwardly by centrifugal force, into engagement with the ratchet teeth 36 of the hub of the wheel, a rotation of the wheel 25 will be effected. At the time that the pulley 27 is effecting the drive to the wheel 25, the pulley 28 is being oscillated rearwardly by the spring 39, which was tensioned during the downward movement of the treadle 46. It will be clearly seen that in the reverse movement of the pulleys 27—28, the treadles 45—46 will be returned to their normal raised positions.

From the foregoing it will be clearly apparent that alternate depression of the treadles 45—46 will impart rotation of the drive wheel 25 and the speed of the coaster will be in accordance with rapidity of depression of the treadles. It will also be apparent that the operator may evenly divide his weight upon the treadles 45—46 holding them in their downward positions in contact with the bar 54. In this position of the treadles, the wheel 25 rotates freely of the pawls 38.

While I have shown and described a preferred form of the invention, it should be understood that I do not confine myself to the exact structure disclosed, and consider as my own all such modifications, as fairly fall within the scope of the appended claims.

I claim:—

1. In a coaster, a frame having a steering wheel and a drive wheel, said drive wheel having a hollow cylindrical hub, counter-sunk annular ratchet members in the bore of said hub near the ends thereof, an axle mounted in said frame and extending through the hub, pulleys oscillatably mounted upon said axle adjacent the respective ends of said hub, each pulley including a trunnion forming a bearing for said hub and for spacing said hub from said axle, a plurality of pawl members pivotally mounted on said trunnions for operative connection with respective ratchet members in one direction of oscillation of said pulley members, a flexible strap member encircling and secured to each pulley, treadle members rockably mounted upon said frame at their forward ends and having their rear ends secured to the respective strap members, and spring means for returning the pedal members to their raised position.

2. In a coaster, a frame having a steering wheel and a drive wheel, said drive wheel having a hollow cylindrical hub, counter-sunk annular ratchet members in the bore of said hub near the ends thereof, an axle mounted in said frame and extending through the hub, pulleys oscillatably mounted upon said axle adjacent the respective ends of said hub, each pulley including a trunnion forming a bearing for said hub and for spacing said hub from said axle, a plurality of pawl members pivotally mounted on said trunnions for operative connection with respective ratchet members in one direction of oscillation of said pulley members, a flexible strap member encircling and secured to each pulley, a pair of treadle members rockably mounted upon said frame at their forward ends, a downwardly extending lug secured to each treadle member at its rear end, means for connecting the straps with the respective lugs, said connecting means being at or below the central axis of the axle in any position of the treadle, and spring means for returning the pedals to their raised position.

ALBERT N. COOPER.